Jan. 29, 1963 W. A. FIEDLER ET AL 3,075,301
LAUNCH AND UNDERWATER TRAJECTORY TEST VEHICLE
Filed July 13, 1961 3 Sheets-Sheet 1

INVENTORS
Willy A. Fiedler
Joseph E. Madden
BY
ATTORNEYS

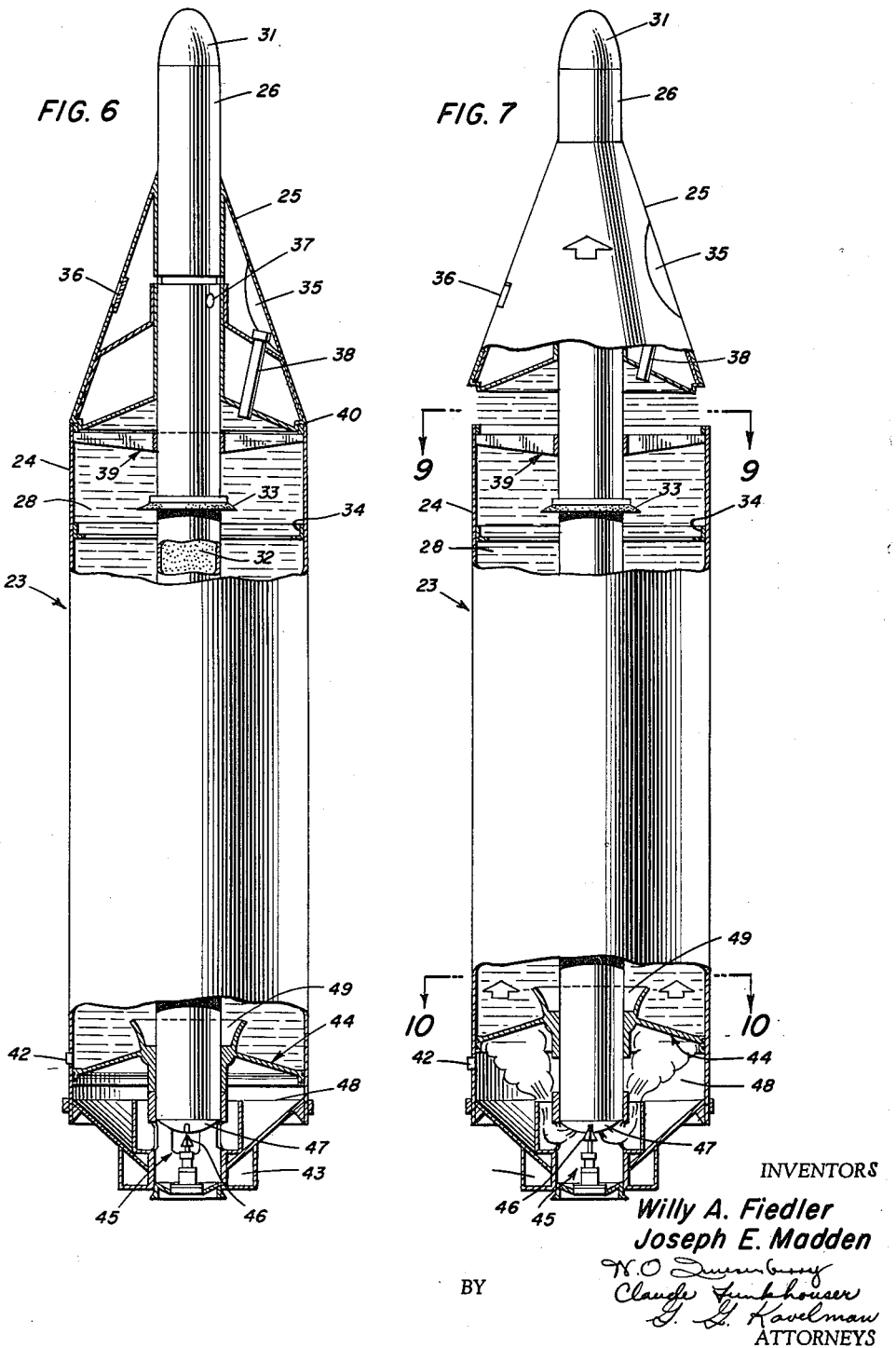

Jan. 29, 1963 W. A. FIEDLER ET AL 3,075,301
LAUNCH AND UNDERWATER TRAJECTORY TEST VEHICLE
Filed July 13, 1961 3 Sheets-Sheet 3
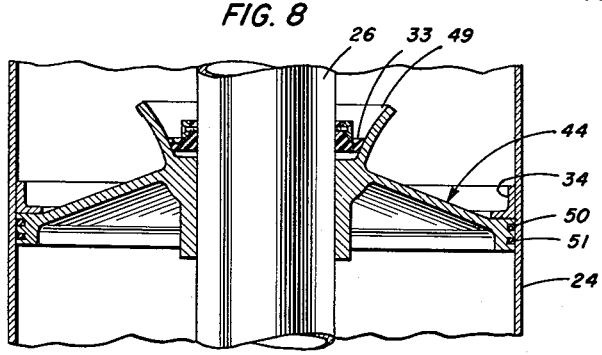
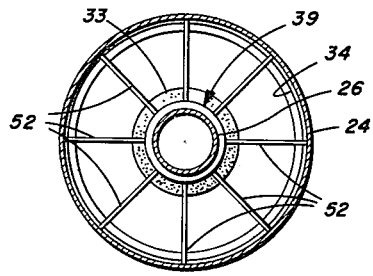
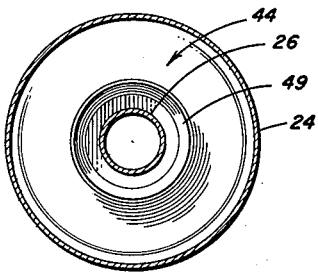
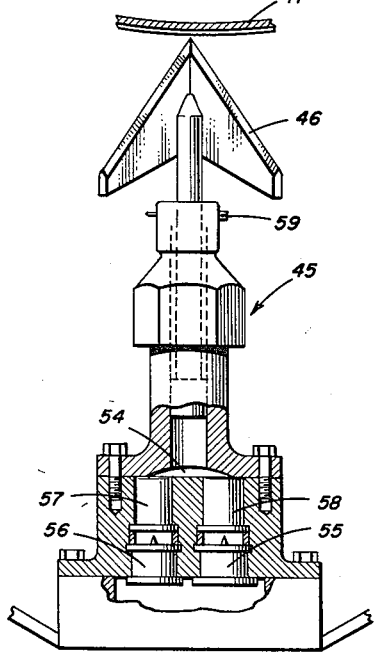
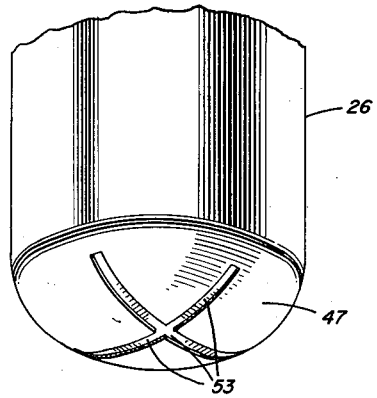
INVENTORS
Willy A. Fiedler
Joseph E. Madden
BY
ATTORNEYS

United States Patent Office 3,075,301
Patented Jan. 29, 1963

3,075,301
LAUNCH AND UNDERWATER TRAJECTORY
TEST VEHICLE
Willy A. Fiedler, Los Altos, and Joseph E. Madden, Mount View, Calif., assignors, by mesne assignments, to the United States of America as represented by the Secretary of the Navy
Filed July 13, 1961, Ser. No. 123,911
10 Claims. (Cl. 35—25)

The present invention relates to missile exercise and test vehicles and more particularly to an underwater launched vehicle for checking submerged missile launcher equipment and obtaining underwater missile trajectory data.

In recent years, underwater launched missiles have come to play a vital role in national defense. In the course of developing such underwater launched missiles, a need has arisen for an economical and reusable exercise and test vehicle, whose cost is only a small fraction of the tactical vehicle being simulated, and which possesses the same weight, center of gravity, pitch and yaw movements of inertia, and external configuration of the tactical propulsive missile. Such a "dummy" missile or dolphin should be useful for underwater launcher check-out, underwater missile trajectory testing, and personnel training. An additional problem confronting designers of such exercise and test vehicles has been the quest for a vehicle capable of eliminating fallback and its inherent danger of launcher damage. Those concerned with the development of underwater launched missiles have long recognized the need for such test and exercise vehicles. The present invention fulfills this need.

The general purpose of this invention, therefore, is to provide a non-propulsive underwater launched test and exercise vehicle capable of duplicating performance characteristics of the tactical missile simulated in regard to underwater launching and underwater travel following launching while minimizing the danger of launcher damage due to subsequent vehicle fallback. To attain these features, the present invention contemplates a new and improved ballasting and deballasting system which closely simulates the tactical missile and enables the kinetic energy of the test vehicle to be rapidly dissipated close to the surface of the water following broach. Also contemplated within the scope of the present invention are new and improved means to render the test vehicle buoyant following deballasting, thereby facilitating recovery of the vehicle for subsequent further testing and use.

One object of the present invention is the provision of an improved underwater launched exercise and test vehicle.

Another object is to provide a launch and underwater trajectory test vehicle possessing the same weight, center of gravity, pitch and yaw moments of inertia, and external configuration of the reference propulsive missile simulated.

An additional object is to provide an improved underwater launched exercise and test vehicle which minimizes the danger of fallback upon the vehicle launcher.

A further object of the invention is the provision of a launch and underwater trajectory test vehicle whose kinetic energy in the forward direction is rapidly dissipated following broach through the water surface.

Still another object is to provide a test vehicle which is rendered buoyant following test to facilitate recovery.

Yet another object of the present invention is the provision of a launch and underwater trajectory test vehicle incorporating a new and improved ballasting and deballasting system.

A still further object is to provide a launch and underwater trajectory test vehicle which simulates a tactical vehicle in a simple and economical manner and which is both readily recoverable and reusable.

Other objects and many of the attendant advantages of this invention will be readily appreciated as the same becomes better understood by reference to the following detailed description when considered in connection with the accompanying drawings wherein:

FIG. 6 is an elevation view of a ballasted launch and underwater trajectory test vehicle in accordance with one embodiment of the invention, portions being broken away to show internal structure in greater detail;

FIG. 7 is an elevation view of the test vehicle shown in FIG. 6 and illustrates internal structure following initiation of deballasting action;

FIG. 8 is a sectional view of the deballasting piston assembly at the termination of deballasting action;

FIG. 9 is a sectional view taken substantially along the line 9—9 of FIG. 7;

FIG. 10 is a sectional view taken substantially along the line 10—10 of FIG. 7;

FIG. 11 is an elevation view of an energy release mechanism and timing device utilized for initiating deballasting, portions being broken away; and FIG. 12 is a perspective view of an accumulator membrane used in conjunction with the energy release mechanism of FIG. 11.

Figure 1:
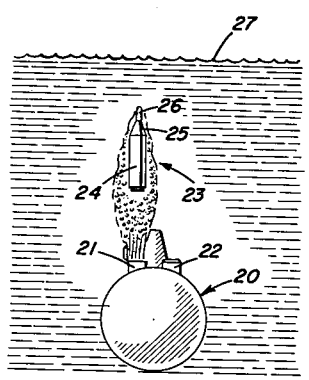
FIGS. 1 through 5 illustrate a typical operational sequence for the launch and underwater trajectory test vehicle of the instant invention.

Referring now to the drawings, wherein like reference characters designate like or corresponding parts throughout the several views, there is illustrated in FIGS. 1 through 5 of the drawings a typical operational sequence for one embodiment of the launch and underwater trajectory test vehicle of the instant invention. FIG. 1 shows an underwater launching device such as the submarine 20, but which may take the form of any suitable launching assembly, either mobile or stationary. The submarine 20 is depicted as having a plurality of launching tubes 21 and 22 from which the launch and underwater trajectory test vehicle 23 may be launched. The test vehicle 23 is shown in FIG. 1 just after launch from tube 21 of the submarine 20. The test vehicle 23 is shown to comprise a main body shell portion 24 and a telescoping cone portion 25. The test vehicle 23 is launched from tube 21 by suitable fluid pressure means, not shown, and the vehicle 23 ascends in an underwater trajectory towards the water surface 27 above the submarine 20.

Figure 2:
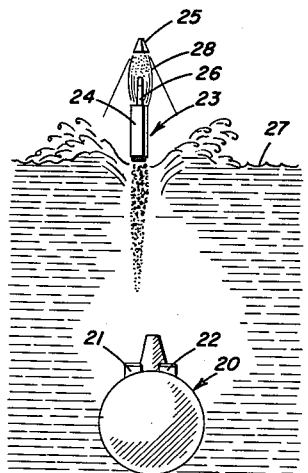

FIG. 2 shows the launch and underwater trajectory test vehicle 23 as it broaches the water surface 27. At this point deballasting has been initiated and the cone 25, telescoped over the spine 26 of the test vehicle 23, separates therefrom under the driving force of the deballasting fluid column 28.

Figure 3:
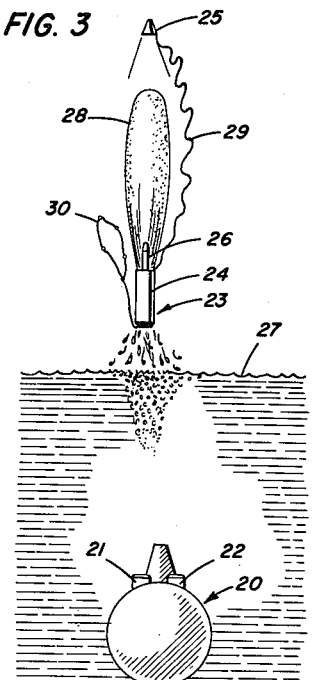

FIG. 3 shows the test vehicle 23 above the water surface 27 at a point when deballasting via the fluid column 28 has been nearly completed. It will be noted from FIG. 3 that the water ballast 28 is ejected essentially in the forward longitudinal direction of vehicle motion. Thus, the shell 24 of test vehicle 23 receives an impulse equal in magnitude but opposite in direction to that imparted to the water ballast 28. Therefore, the forward momentum of the test vehicle 23 is rapidly decreased to zero due to this rearward impulse. In this manner, the kinetic energy of the test vehicle 23, as it broaches, is rapidly dissipated close to the water surface 27, so that the vehicle 23 is not allowed to rise very far above the latter surface 27, and thus, the danger of fallback damage to the launcher or submarine 20 is significantly reduced.

Figure 4:
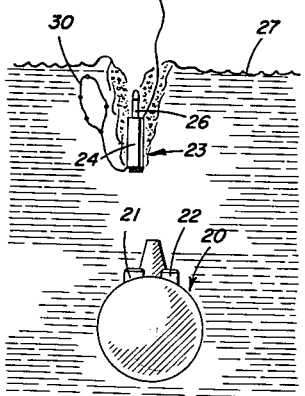

FIG. 4 shows the test vehicle 23 after it has dropped back into the water from which it emerged. The cone 25 is limited in its travel by a strong, flexible cable 29, of nylon or the like. A messenger line 30 is attached to the shell 24 of the test vehicle 23 to facilitate towing of the vehicle 23 during the recovery process.

Figure 5:
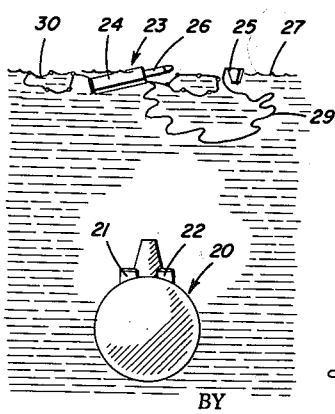

FIG. 5 shows the missile in its buoyant state floating in the water and awaiting recovery. It will be noted that, after deballasting, the missile floats in an approximately 6° nose up attitude. In this condition, the test vehicle 23 possesses little sail area and has sufficient drag to prevent excessive shift of position by wind, thus facilitating ready recovery.

FIGS. 6 and 7 depict in elevation a launch and underwater trajectory test vehicle, in accordance with the instant invention, and suitable for performing the operational sequence shown in FIGS. 1 through 5 of the drawings. The test vehicle shown, though designed primarily for use with a water ballast, may utilize any other suitable inexpensive fluid ballast without departing from the spirit and scope of the present invention, and weighs approximately half as much as the tactical missile simulated when empty. The use of water as a ballast medium for attaining the equivalent launch weight of the simulated tactical missile provides an inexpensive and easily ejected material for making the test vehicle 23 buoyant after completion of a launching. The test vehicle 23 shown in FIGS. 6 and 7 of the drawings comprises five principal components which are a main shell 24, a central spine 26, a deballasting piston 44, a truncated cone 25, and a forebody 31.

The main shell 24 of the test vehicle 23 is a right circular cylinder, which may be of metal, plastic or any other suitable structural material, and has the reference missile's exterior dimensions for this section. The aft end of the main shell 24 is closed by the piston 44 and any suitable bottom closure structure which may, in one embodiment, be formed to simulate the motor nozzles of a tactical vehicle. The forward end of the main shell 24 contains a spider assembly 39 which supports and concentrically aligns the central spine 26 with respect to the main shell 24. The main shell 24 also accommodates a forward sealing ring 34, of metal or the like, which is utilized for sealing the outer circumference of a deballasting piston 44 at the end of its travel during the deballasting stroke along spine 26. The main shell 24 is adapted to receive and contain a suitable fluid ballast 28, such as water or the like, and is provided with a drain plug device 42 for use whenever removal of the fluid ballast 28 is desired.

The spine 26 is a central tube or cylindrical structure running nearly the full length of the test vehicle 23. The spine 26 has provisions for attaching a head or forebody 31, which may be either ballasted or instrumented for evaluation data, at its forward end. A large portion of the spine 26 consists of an air accumulator cavity 32 containing a pressure rupture membrane 47 at its bottom or aft end. The spine 26 is provided with a gas charge valve or filler cap 37 at its top. Of course, it should be understood that any type of energy source suitable for the purpose, could be readily substituted for the air accumulator energy source in spine 26, with other components of the test vehicle 23 remaining essentially the same. The main portion of the spine 26 acts as a guide for the deballasting piston 44. The lower end of the spine 26 positions rupture membrane 47 of accumulator 32 adjacent a mechanically or pyrotechnically activated energy release device 45, provided with a piston knife 46, which is activated at a suitable time to cause rupture of the membrane 47 and thereby release the compressed air from accumulator 32 into a plenum or expansion chamber 48. The release of compressed air from the accumulator 32 into plenum chamber 48 forces piston 44 upwards along the spine 26 and main shell 24 to cause deballasting of the water or other fluid 28 stored within the main shell 24.

FIG. 6 depicts the internal structure of the test vehicle 23 prior to rupture of the accumulator membrane 47 and initiation of deballasting. In contrast, FIG. 7 illustrates the internal structure of test vehicle 23 immediately following rupture of the accumulator membrane 47 and release of compressed air into the plenum chamber 48 to force the piston 44 upward along the spine 26 and effect deballasting of the vehicle via ejection of the stored fluid body 28. The spine 26 shown in FIGS. 6, 7, and 8 also contains a forward snubber seal ring 33, shown in greater detail in FIG. 8 of the drawings, to seal the inner circumference of the deballasting piston 44 at the termination of the latter piston's forward travel along spine 26 and main shell 24.

FIG. 8 shows the piston 44 in the post-stroke position at the end of the deballasting operation. The piston 44 is a disc composed of a suitable light material, such as aluminum or the like, which fits slidingly around the spine 26 and extends outwardly to the main shell 24. The piston 44 is shown as incorporating two sets of seal rings 50 and 51, of rubber, silicone plastic, or the like. The principal functions of piston assembly 44 are to drive out the ballast fluid 28, to act as a closure in the forward post-stroke position for rendering the test vehicle 23 buoyant following deballasting procedures, and, in the aft position, prior to deballasting initiation, to prevent the bypass of water into the air expansion or plenum chamber 48 of test vehicle 23. In its forward sealing position piston 44 is stopped by the forward stopseal ring 34 mounted on main shell 24 and is also sealed by seal ring 33 mounted on the spine 26. The forward seal ring 33 on spine 26 may either be of a suitable rubber or plastic material or the like, to snub and hold the piston 44 in its sealing position, or the ring 33 may be of a less flexible material, such as metal or the like, the piston 44 being, in this latter instance, held against forward seal rings 33 and 34 by residual gas pressure on its underside. Both of these alternative methods of maintaining the piston 44 in the forward sealing position are considered equally effective in preventing sea water from entering the main shell 24 of test vehicle 23.

Referring now again to FIG. 6 of the drawings, the cone 25 is shown to be a water tight frustum which mounts upon the central spine 26 in telescoping engagement and attaches to the main shell 24 by means of a simple joint 40. The cone 25 contains a ballast fill tube 38 and an access door 35 to enable ready access to the gas charge valve 37 in spine 26 and ballast fill tube 38. Cone 25 is also provided with an alignment window 36 to enable proper alignment of the test vehicle 23 in the launcher tube prior to actual launch.

The forebody or nose cone 31 of the test vehicle 23 is attached to the extreme forward end of the spine 26 and may contain either metal or concrete ballast if the test vehicle 23 is to be used for training or launcher testing purposes, or the forebody 31 may contain an instrumentation package if the test vehicle 23 is to be used to obtain underwater trajectory data.

FIG. 9 is a sectional view taken substantially along the line 9—9 of FIG. 7 and shows in detail the structure of the spider assembly 39 which supports and centrally aligns the spine 26 with respect to the main shell 24. The spider 39 is shown to comprise a plurality of rib sections 52 which provide axial rigidity for the main shell 24 as well as a suitable passage for ballast fluid entering via fill tube 38 shown in FIG. 6.

FIG. 10 is a sectional view taken substantially along the line 10—10 of FIG. 7 and, when considered in combination with FIG. 8, illustrates in detail the structure of the deballasting piston 44. The piston assembly 44 is shown to include a flared cup section 49 which acts in conjunction with the forward seal ring 33 to provide a variable-orifice water trap for effectively decelerating the piston 44 during the latter portion of the deballasting stroke.

FIG. 11 depicts in greater detail the timing and energy release mechanism 45 shown in FIG. 6 of the drawings. The mechanism 45 is shown to comprise a pair of timers 55 and 56. The tuners 55 and 56 activate suitable pyrotechnic devices or cartridges 57 and 58 to cause rapid gas expansion in a firing chamber 54. The latter increase in gas pressure causes shear pin 59 to shear and expells the piston knife 46 into the membrane 47 of the accumulator 32 housed within spine 26. It will be understood that, if desired, any other suitable type of driving means may be utilized to expell the piston knife 46 without departing from the spirit and scope of the instant invention and the depicted pyrotechnic embodiment is to be considered solely as illustrative. More over, the use of a single timing mechanism in lieu of the dual timers 55 and 56 is likewise contemplated by the present invention.

FIG. 12 illustrates the membrane 47 mounted at the aft end of the spine 26. The rupture membrane 47 is fabricated of a soft metal, such as monel or the like, and is scored with radial grooves 53 in alignment with the blades of the piston knife 46 to insure positive penetration of the membrane 47 via the knife 46 without fragmentation.

Additional ballast for the test vehicle 23 may be placed at any convenient location in the vehicle such as in the simulated nozzle area 43 shown in FIG. 6, or in the main shell 24, and may consist of any suitable ballast material such as concrete or metal, or the like.

The test vehicle of the instant invention provides economical and reusable means for obtaining underwater trajectory data, for testing underwater launching devices, and for training personnel. The test vehicle simulates the tactical vehicle by possessing the same weight, center of gravity, pitch and yaw moments of inertia, and external configurations of the reference propulsive missile being simulated. The deballasted vehicle weighs only a small part of its launch weight and has its kinetic energy rapidly reduced to zero upon broach through the water surface. Thus, the test vehicle falls back into the water from a minimal height and is quickly decelerated to rest by drag and buoyant forces, the latter feature of buoyancy enabling ready recovery for subsequent reuse.

Obviously many modifications and variations of the present invention are possible in the light of the above teachings. It is therefore to be understood that within the scope of the appended claims, the invention may be practiced otherwise than as specifically described.

What is claimed is:

1. A launch and underwater trajectory test vehicle to be fired from an underwater launcher towards the water surface, said vehicle comprising a main body structure, a fluid ballast contained by said main body structure, a cone structure, means for attaching said cone structure to said main body structure to enable said cone structure to be readily detached under the influence of fluid pressure, piston deballasting means slidably supported within said main body for creating said fluid pressure as the piston deballasting means is moved therein to eject said cone structure and fluid ballast in the forward longitudinal direction of vehicle motion and to render said vehicle buoyant, a normally sealed container disposed within the body structure for slidably supporting the piston deballasting means, a quantity of fluid under pressure within said container for moving said piston deballasting means as the container is unsealed upon broach of said vehicle, whereby the forward momentum of said vehicle is rapidly dissipated upon broach and said vehicle may be readily recovered in its buoyant state, and means including a pyrotechnic actuated device for unsealing said container upon broach of the vehicle.

2. A launch and underwater trajectory test vehicle to be fired from an underwater launcher towards the water surface, said vehicle comprising a main body structure, a fluid ballast contained by said main body structure, a cone structure, means for attaching said cone structure to the forward end of said main body structure to enable said cone structure to be readily detached under the influence of fluid pressure, deballasting piston means slidably supported within said main body structure for creating said fluid pressure as the deballasting piston means is moved therein to eject said cone structure and fluid ballast in the forward longitudinal direction of vehicle motion, a normally sealed container centrally disposed within the main body structure for slidably supporting said deballasting piston means, gas under pressure disposed within said container for driving said deballasting piston means as said container is unsealed, sealing means in the forward end of said main body structure to seal said deballasting piston means upon completion of deballasting and to render said vehicle buoyant, timer means, pyrotechnic means responsive to said timer means, and means responsive to said pyrotechnic means for unsealing said container upon broach of said vehicle through the water surface, whereby the forward momentum of said vehicle is rapidly dissipated upon broach and said vehicle may be readily recovered in its buoyant state.

3. A launch and underwater trajectory test vehicle to be fired from an underwater launcher upwards to the water surface, said vehicle comprising a cylindrical main body shell, a fluid ballast contained by said main body shell, a central spine supported in coaxial alignment with said main body shell, a frustum of a cone structure supported in telescoping engagement with said spine and whose axis of revolution is coaxial with said spine, means for attaching said cone structure to the forward end of said main body shell to enable said cone structure to be readily detached under the influence of fluid pressure, piston deballasting means for ejecting said cone structure and said fluid ballast in the forward longitudinal direction of vehicle motion, said piston deballasting means being located within said main body shell and in sliding engagement with said central spine and the interior of said main body shell, sealing means at the forward end of said main body shell for rendering said vehicle buoyant upon ejection of said fluid ballast by said piston deballasting means, gas pressure means for driving said deballasting means, timer means, and means responsive to said timer means to actuate the said gas pressure means upon broach of said vehicle through said water surface, whereby the forward momentum of said vehicle is rapidly dissipated upon broach by the rearward impulse of said ejected fluid ballast upon said vehicle and said vehicle may be readily recovered in its buoyant state.

4. The test vehicle of claim 3 wherein said fluid ballast is water.

5. The test vehicle of claim 3 wherein said gas pressure means includes a source of high pressure air.

6. The test vehicle of claim 3 wherein said gas pressure means includes a pressurized air-filled accumulator cavity within said spine and a rupture membrane at the base of said spine, and said timer responsive means includes a piston knife adapted to pierce said rupture membrane.

7. The test vehicle of claim 3 wherein said sealing means includes a first piston sealing ring mounted concentrically along the interior wall of said main body shell and a second piston sealing ring mounted concentrically on the outer wall of said spine.

8. The test vehicle of claim 6 wherein said rupture membrane is scored in alignment with the blades of said piston knife to eliminate fragmentation.

9. The device of claim 6 wherein said piston knife is pyrotechnically actuated by said timer means.

10. The device of claim 7 wherein the forward end of said piston deballasting means possesses a cup flare providing a variable-orifice fluid trap with said second piston sealing ring, whereby said piston deballasting means is decelerated during the latter portion of its travel along said spine and said main body shell.

References Cited in the file of this patent

UNITED STATES PATENTS

| | | |
|---|---|---|
| 1,376,316 | Chilowsky | Apr. 26, 1921 |
| 2,539,643 | Smythe | Jan. 30, 1951 |